US011971944B1

(12) United States Patent
Ram et al.

(10) Patent No.: US 11,971,944 B1
(45) Date of Patent: Apr. 30, 2024

(54) SUPPRESSION FILTER FOR PRESENTING CONTENT IN A NETWORK DOCUMENT

(71) Applicant: Amazon Technologies, Inc., Seattle, WA (US)

(72) Inventors: Amritha Ram, Seattle, WA (US); Alexander Slutsker, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/486,183

(22) Filed: Sep. 27, 2021

(51) Int. Cl.
*G06F 16/957* (2019.01)
*G06F 16/951* (2019.01)
*G06F 16/9535* (2019.01)
*G06F 16/9538* (2019.01)

(52) U.S. Cl.
CPC ........ *G06F 16/9574* (2019.01); *G06F 16/951* (2019.01); *G06F 16/9535* (2019.01); *G06F 16/9538* (2019.01); *G06F 16/9577* (2019.01)

(58) Field of Classification Search
CPC .............. G06F 16/9574; G06F 16/951; G06F 16/9535; G06F 16/9538; G06F 16/9577
USPC ........................................................ 707/722
See application file for complete search history.

(56) References Cited

U.S. PATENT DOCUMENTS

| 9,996,626 | B1* | 6/2018 | Bailey | G06F 16/9535 |
| 2005/0102534 | A1* | 5/2005 | Wong | G06F 21/577 |
| | | | | 726/4 |
| 2005/0273723 | A1* | 12/2005 | Sharpe | A61F 5/03 |
| | | | | 715/764 |
| 2011/0283309 | A1* | 11/2011 | Bliss | G06F 40/106 |
| | | | | 725/25 |
| 2019/0052096 | A1* | 2/2019 | Kudo | H02J 7/0013 |
| 2020/0358732 | A1* | 11/2020 | Raviv | H04L 51/42 |

* cited by examiner

*Primary Examiner* — Kuen S Lu
(74) *Attorney, Agent, or Firm* — Kilpatrick Townsend & Stockton LLP

(57) ABSTRACT

Techniques for using suppression filters for presenting content of a network documents are described. In an example, a computer system receives, from a device associated with an account identifier, a request for an online network document. The computer system determines that a first category identifier of a first item category is associated with a suppression filter. The computer system determines that the account identifier is associated with an online item interaction having an interaction time associated with an item that belongs to the first item category. The computer system determines, based on a comparison of the interaction time and the suppression time, that a presentation of the first content in the online network document is prohibited. The computer system sends, to the device in response to the request, network document data that indicates second content about a third item that belongs to a second item category.

20 Claims, 12 Drawing Sheets

Account Data 632

Item Data Structure 772
Key: Item ID
Value: Category ID

Item Acquisition Data Structure 774
Key: Item ID / Category ID
Value: Acquisition Time / Category ID Item View Data Structure 776
Key: Item ID / Category ID
Value: View Time / Category ID Override Data Structure 778
Key: Account ID
Value: Category ID

FIG. 7

SUPPRESSION FILTER FOR PRESENTING CONTENT IN A NETWORK DOCUMENT

BACKGROUND

Content can be inserted in a web page of a web site upon a request of a user device for the web page. Different content types are possible, including a recommendation about an item that may be acquired from the web site. Generally, processing related to determining the content (e.g., the recommendation) for insertion and the loading of the web page needs to meet a maximum acceptable latency. Otherwise, the responsiveness of the web site may be too long resulting in unacceptable user experience.

BRIEF DESCRIPTION OF THE DRAWINGS

Various embodiments in accordance with the present disclosure will be described with reference to the drawings, in which:

FIG. 7 illustrates an example of data structures of account data for an account, according to an embodiment of the present disclosure;

DETAILED DESCRIPTION

Figure 1:
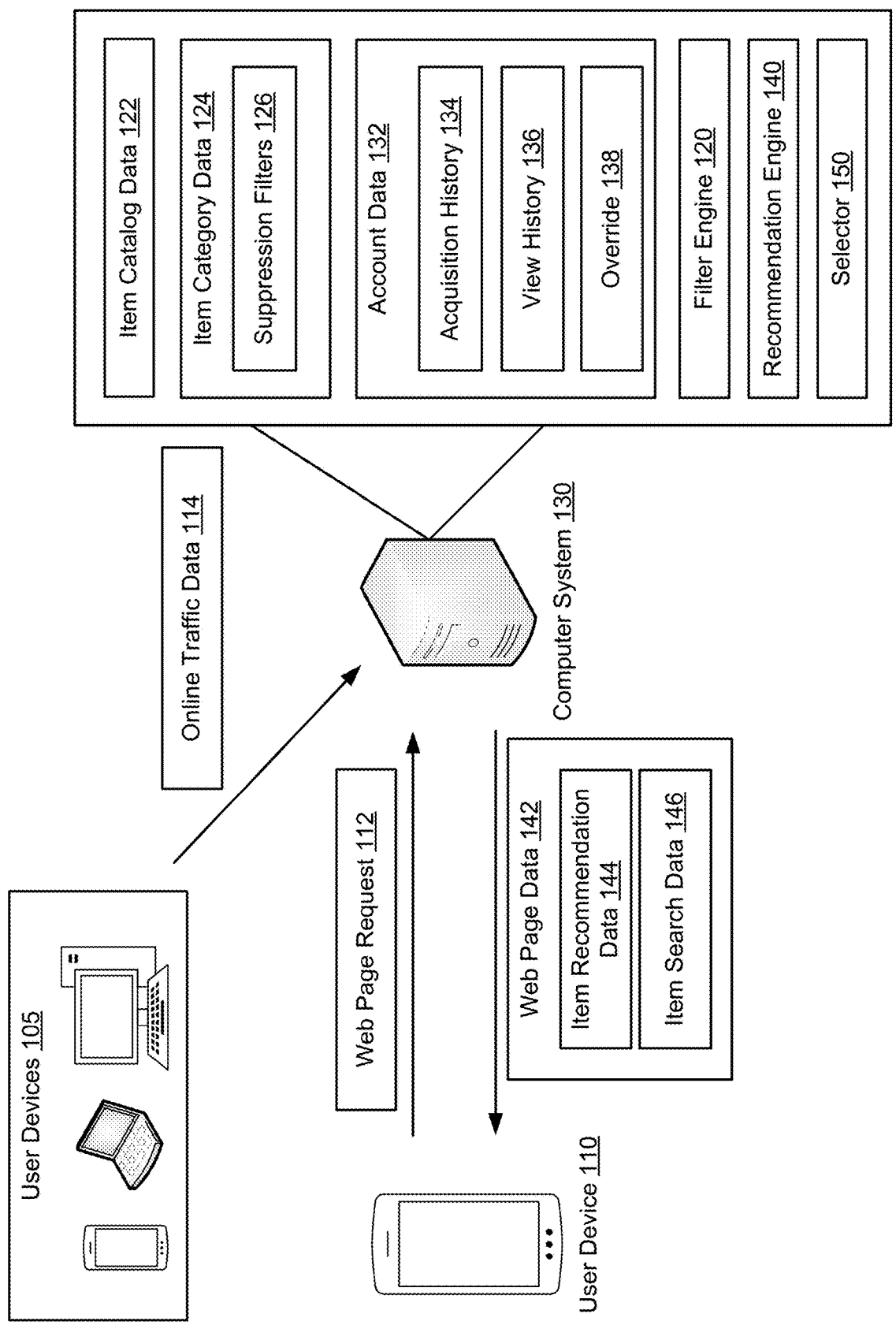
FIG. 1 illustrates an example of an environment for presenting content in a network document, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, suppression filters for presenting content in a network document. In an example, a computer system stores, in a first data structure, a first suppression filter in association with a first item category. The first item category includes a first item for which first content is presentable by a recommendation engine. The first suppression filter prohibits the first content from being presented. The first data structure can include a first category identifier of the first item category as a first key and a suppression time of the suppression filter as a first value. The computer system also stores, in a second data structure, a first history of item interactions in association with an account. The item interactions can include an online interaction (e.g., an online acquisition or an online view) associated with the first item or with a second item of the first item category. The second data structure can include an account identifier of the account as a second key, the first category identifier as a second value, and an interaction time of the online interaction as a third value. In addition, the computer system stores, in a third data structure, an override in association with the account. The override indicates that a second suppression filter applicable to a second item category is inapplicable to the account. The third data structure can include the account identifier as a third key and a second category identifier of the second item category as a fourth value. The computer system receives, from a device associated with the account identifier, a request for a network document. The computer system determines, based on a first look-up of the third data structure using the account identifier, that the override applies to the second item category and is inapplicable to the first item category. The computer system also determines, based on a second look-up of the second data structure using the account identifier, the interaction time and the first item category. In addition, the computer system determines, based on a third look-up of the first data structure using the first item category, the suppression time. Based on a comparison of the interaction time and the suppression time, the computer system determines that the first suppression filter applies to the account identifier. The computer system includes the first category identifier in a list of suppressed item categories and excludes the second category identifier from the list of suppressed item categories. The computer system determines, based on the list of suppressed item categories, that second content of the recommendation engine can be presented in the network document. The second content is associated with a third item of the second item category. The computer system sends, to the device in response to the request, network document data for presentation at the device, which indicates the second content.

To illustrate, consider a user operating a user device to browse a web site of an online retailer. The user is associated with an account and has previously acquired a vacuum from the online retailer through the account. The user device sends a web page request for a web page of the web site (e.g., a home page). A computer system (e.g. a web server) receives the web page request and determines items of the online retailer to recommend on the web page. In parallel, the computer system determines a list of content that can be presented. The computer device may have previously determined that accounts typically re-acquire vacuums every two years. Thus, the computer system previously assigned a suppression filter of 1.5 years to an item category associated with vacuums. Upon determining the account acquired the vacuum six months ago, the computer system determines the suppression filter applies, so vacuums, and any other items in the item category, should not be recommended at the web page. The item category associated with vacuums is added to a list of suppressed item categories. Thereafter, the computer system determines which content on the list of content to be presented is not associated with an item category on the list of suppressed item categories. The computer system then selects the content that is to be presented at the web page as a recommendation. Therefore, vacuums are not presented to the user until the suppression filter no longer applies to the account.

Embodiments of the present disclosure provide various technological advantages. For example, by using the data structures as previously described, account data is associated with an item category. As a result, the look-up of suppression filters can be performed at a category level rather than an item level, reducing a number of look-ups and latency for the computer system. Additionally, since the content recommendable content and the suppressed item categories are determined in parallel to then select particular content, a web page can be presented within a target time period (e.g., a maximum processing latency) from a web page request. Accordingly, the responsiveness of the web site meets the service-level agreement (SLA) for a target user experience, while improving the relevance of the content inserted in the web page (e.g., the selected content does not belong to a suppressed item category).

FIG. 1 illustrates an example of an environment for presenting content in a network document, according to embodiments of the present disclosure. Generally, the network document may be a document stored at a network location and accessible to a user device over a data network. A web page is an example of the network document. The environment includes user devices 105, a user device 110, and a computer system 130. The computer system receives online traffic data 114 from the user devices 105. The online traffic data 114 includes a history of online re-acquisitions for multiple items by multiple accounts. Each account may be associated with one of the user devices 105, or the user devices 105 may each be associated with more than one account. The online traffic data 114 may correspond to a particular item category, or may be for multiple item categories. An item category may be a category of items that share one or more attributes. The attributes may relate to a concept for how the items are typically consumed or used by end users.

The computer system 130 can generate item category data 124 and item catalog data 122 from the online traffic data 114. The computer system 130 may maintain the item catalog data 122 of a plurality of items in a hard drive. The item catalog data 122 can include item descriptions associated with each of the plurality of items. Such descriptions can be used as document content (e.g., the item description of an item can be used as content of a web page about the item). The computer system 130 may assign each of these items to an item category of a plurality of item categories that are represented in non-hierarchical taxonomy. U.S. patent application Ser. No. 16/588,680, which is herein incorporated by reference, provides an example of how items may be assigned to an item category. Additionally, the item category data 124 may include properties such as an online re-acquisition frequency, an online re-acquisition likelihood, or an online re-acquisition time distribution that are determined based on the online traffic data 114. The item category data 124 may be stored in a random access memory (RAM) for faster access relative to the item catalog data's 122 storage in hard drive.

The item category data 124 includes a key-value data set of suppression filters 126. Each of the suppression filters 126 is associated with an item category including an item for which content is presentable by a recommendation engine 140. The suppression filters 126 prohibit the content from being presented for a predefined suppression time. In the key-value data set, a category identifier (ID) associated with the item category is stored as a key and a suppression time of the suppression filter is stored as a value. For example, a key for an item category of "household toothpaste" may be associated with a value of "two months" in the key-value data set for the suppression filters 126. This data structure may reduce latency compared to other data structures. For example, another data structure may have a first key-value pair that maps an item to an item category and a second key-value pair that maps the item category to a suppression time. This would result in twice the look-up time.

Further, the suppression filters 126 can be updated over time. For instance, at a subsequent point in time, the computer system 130 may determine an update to a history of re-acquisitions for items in the item category and may determine an updated suppression time based on the update. The key-value data set of the suppression filters 126 can be modified to include the updated suppression time.

In an example, the computer system 130 receives a web page request 112 from a user device 110. The web page can correspond to a network document. The user device 110 may be included in the user devices 105, or may be an additional user device. A recommendation engine 140 of the computer system 130 can receive the web page request 112 and determine content to be presented. The recommendation engine 140 may generate a list of content that can be presented as recommendations insertable in the web page.

In an example, the computer system 130 determines an account associated with the user device 110 based on an account identifier (ID) received with the web page request 112. The computer system 130 stores account data 132 associated with the account ID. The account data 132 can include a first key-value data set of a history if item interactions in association with the account. The item interactions include online interactions associated with items of an item category, such as an acquisition history 134 indicating an acquisition time corresponding to online acquisitions of items in the item category and a view history 136 indicating a view time corresponding to online views of items in the item category. In the first key-value data set, the account ID associated with the user device 110 is stored as a key, a category ID associated with the item category is stored as a first value, and interaction times associated with the online interactions is stored as a second value. In some examples, the computer system 130 may store a first data structure for the acquisition history 134 and a second data structure for the view history 136.

The account data 132 may additionally include an override 138 in associated with the account stored in another key-value data set. The override 138 indicates that a suppression filter applicable to a particular item category is inapplicable to the account. The override 138 may be based on the online re-acquisition rate of items that belong to the item category for the account differing from the online re-acquisition rate of items that belong to the item category for many accounts. In the key-value data set, the account ID can be stored as a key and the item category ID can be stored as the value. Over time, the computer system 130 may determine an update to the online re-acquisition rate for the account or the online re-acquisition rate for many accounts. The computer system 130 can adjust the override 138 based on the update and modify the key-value data set to include the updated override.

In an example, parallel to the recommendation engine 140 generating the list of content, a filter engine 120 determines item categories for which the suppression filters 126 apply. The filter engine 120 performs a look-up of the key-value data set associated with the override 138 to determine whether the override 138 applies to a particular item category. For example, the computer system 130 may determine that the override is inapplicable to a first item category but is applicable to a second item category. Additionally, the computer system 130 performs another look-up of the key-value data set associated with the history of item interactions to determine the interaction time for the first item category. For example, the computer system 130 may determine from the acquisition history 134 in the key-value data set that the account acquired an item in the first item category two days ago. The computer system 130 also performs an additional look-up of the key-value data set associated with the suppression filters 126 to determine the suppression time associated with the first item category. For example, the suppression filters 126 can indicate the suppression time for the first item category is thirty days. Since the acquisition history 134 and the view history 136 are correlated to item categories, the computer system 130 can look-up the suppression filters 126 for item categories, rather than individual items, further reducing latency of the computer system 130.

The filter engine 120 compares the interaction time to the suppression time to determine whether content associated with an item in the first item category can be presented. If the interaction time is less than the suppression time the computer system 130 determines that the suppression filter applies to the account ID and the content cannot be presented. Alternatively, if the interaction time is greater than the suppression time, the suppression filter does not apply to the account ID. Upon determining a suppression filter applies to the account ID, the filter engine 120 includes the category ID for the item category in a list of suppressed item categories. Item categories that are determined not to be applicable to the account ID are excluded from the list of suppressed item categories. The filter engine 120 may perform the look-up of the override 138 prior to the other look-ups. If the override 138 applies for an item category, the item category is not included in the list of suppressed item categories. Thus, performing this look-up first can reduce latency for the computer system 130.

In an example, a selector 150 of the computer system 130 receives the list of content from the recommendation engine 140 and the list of suppressed item categories from the filter engine 120. Content in the list corresponding to an item that belongs to an item category in the list of suppressed item categories is determined to not be presentable in the web page. The selector 150 compares the list of content to the list of suppressed item categories to determine which content is presentable. The selector 150 then selects presentable content. The computer system returns, to the user device 110, web page data 142 that includes item recommendation data 144 to be presented in the web page. The item recommendation data 144 is the content that is determined to be presented by the selector 150.

Generally, a browser on the user device 110 can present the web page based on the web page data 142 and executable code (e.g., Javascript) of the web page. As presented, the web page can include content about one or more items, and different spaces. A first space can be used to display search results and can be referred to herein as a search result space. A second space can be used to display recommendations and can be referred to herein as a recommendation space. The item recommendation data 144 can include information used to display the content about the recommended item in a recommendation space. Further, if a web search was made, one or more keywords requesting information about one or more items can be received and processed by the computer system. The computer system 130 can include item search data 146 in the web page data 142 such that the browser can display a search result in the first space based on the item search data 146. The item search data 14 can include information used to display the content about a searched item as a search result. The selection of the item search data 146 for presentation in the search result field may be independent of the selection of the item recommendation data 144 for presentation in the recommendation space. For example, suppression filters may not apply to the search functionality depending on the specificity of a requested search. In an illustration, when the requested search is specific to an item (or an item category) to which a suppression filter would otherwise (e.g., the difference between the time of the search request and the interaction time is less than the length of the suppression time), the search result can still include information about the item (or the item category). However, if the requested search is broader than the item category and the search result includes items of many item categories, the suppression filter can be applied to remove the item (or the item category) from the search result. For instance, assume that "toilet seats" is an item category to which a suppression filter applies (e.g., the suppression filter is for six months, and the last interaction time is from two months ago). If a search is requested for a particular toilet seat model or for the general toilet seats category, the search result would include information about such items (despite that the difference between the search request time and the last interaction time is two months and is shorter than six months). In comparison, if a search is requested for a home remodel and the search results includes information about many other item categories (e.g., living room furniture, paint, power tools, etc.), information about toiler seat items can be suppressed from the search result.

Performing the content recommendation generation and the suppression filter determination in parallel can allow the web page to be presented at the user device 110 within a predefined time limit. For example, the time limit may be 150 ms. The key-value data sets organized as described may improve an ability of the computer system 130 providing the web page within the time limit.

In an example, the computer system 130 may update the suppression filters 126 over time. The computer system 130 may receive additional online traffic data and determine that a rate of online re-acquisitions for an item category changes, so the computer system 130 can update the suppression time associated with the item category accordingly. The key-value data set of the suppression filters 126 can be updated to include the updated suppression time. Then, the computer system 130 may receive a second web page request from the user device 110. Based on the updated suppression time, the suppression filter for the item category may no longer apply, so the selector 150 can determine that content associated with the item category can be presented in a second web page. The computer system 130 can send other web page data to the user device 110 that includes content associated with the item category.

In an example, the computer system 130 may receive feedback about item recommendations. The feedback may include feedback data associated with item recommendations for an item category and may be associated with many accounts. Based on the feedback data the computer system 130 determines an updated suppression time and modifies the key-value data set of the suppression filters 126 to include the updated suppression time.

Figure 2:
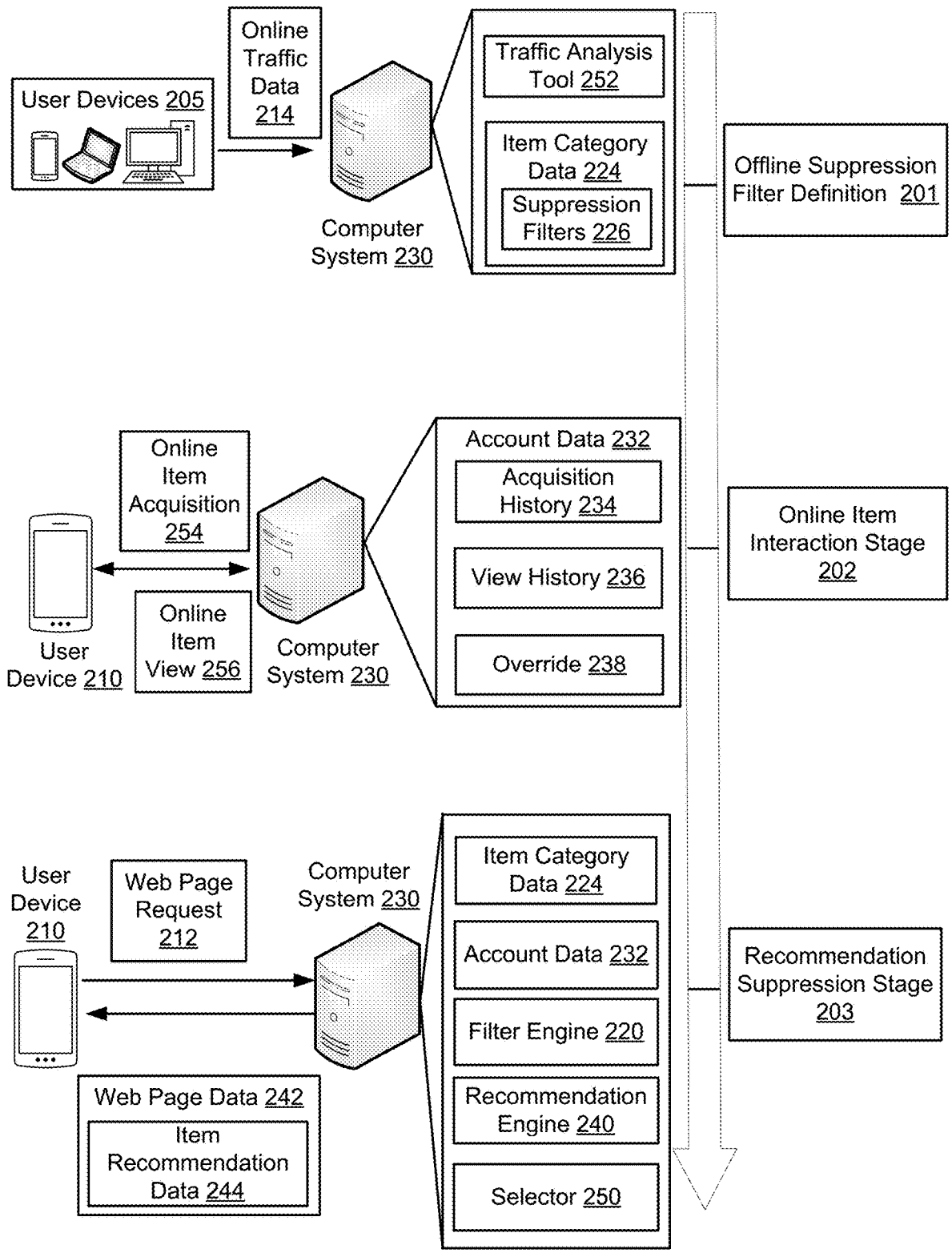
FIG. 2 illustrates an example of stages of presenting content based on suppression filters, according to an embodiment of the present disclosure.

FIG. 2 illustrates an example of stages of presenting content based on suppression filters, according to an embodiment of the present disclosure. As illustrated, the stages include an offline suppression filter definition stage 201, an online item interaction stage 202, and a recommendation suppression stage 203.

During the offline suppression filter definition stage 201, a computer system 230 receives online traffic data 214 from user devices 205. The computer system 230 is an example of the computer system 130 in FIG. 1 and the user devices 205 are an example of the user devices 105 in FIG. 1. A traffic analysis tool 252 of the computer system 230 determines a frequency of item re-acquisition based on the online traffic data 214. The computer system 230 may receive the online traffic data 214 periodically, such as daily, to determine the frequency of re-acquisition of items. Based on the frequency of re-acquisition of items associated with an item category, the computer system 230 determines suppression filters 226, which are stored in item category data 224 for the item category. For example, if items of an item category are re-acquired, on average, after three months, the suppression filter for the item category may be two and a half months (or some other predefined percentage value of the average re-acquisition time). With such a suppression filter, content for items in the item category is not be presented for two and a half months after the item in the item category is acquired.

During the online item interaction stage 202, the computer system 230 receives an item interaction from a user device 210. The user device 210 is associated with an account ID. The item interaction includes an online item acquisition 254 or an online item view 256 of an item. Account data 232 associated with the account ID is updated based on the online item acquisition 254 or the online item view 256. Acquisition history 234 can be updated based on the online item acquisition 254 and view history 236 can be updated based on the online item view 256. For example, an indication of the item category associated with the online item acquisition 254 or the online item view 256 and a time of the interaction can be included into the acquisition history 234 or the view history 236, respectively.

During the recommendation suppression stage 203, the computer system 230 receives a web page request 212 from the user device 210. Upon receiving the web page request 212 a filter engine 220 and a recommendation engine 240 begin performing respective operations associated with determining content to present on the web page at the user device 210 in parallel. The filter engine 220 is an example of the filter engine 120 in FIG. 1 and the recommendation engine 240 is an example of the recommendation engine 140 in FIG. 1. The recommendation engine 240 determines content to be presented and generates a list of content that can be presented as recommendations. The filter engine 220 determines item categories for which the suppression filters 226 apply based on the item category data 224. The filter engine 220 performs a look-up of the override 238 associated with the account ID to determine whether the override 238 applies to a particular item category. Additionally, the computer system 230 performs a look-up of the acquisition history 234 and the view history 236 to determine interaction times for item categories. The computer system 230 also performs an additional look-up the suppression filters 226 to determine suppression times associated with the item categories.

The filter engine 220 compares the interaction times to the suppression times to determine whether content associated with an item in the item categories can be presented. If the interaction time is less than the suppression time the computer system 230 determines that the suppression filter applies to the account ID and the content cannot be presented. Alternatively, if the interaction time is greater than the suppression time, the suppression filter does not apply to the account ID. Upon determining a suppression filter applies to the account ID, the filter engine 220 includes the category ID for the item category in a list of suppressed item categories. Item categories that are determined not to be applicable to the account ID are excluded from the list of suppressed item categories.

In an example, a selector 250 of the computer system 230 receives the list of content from the recommendation engine 240 and the list of suppressed item categories from the filter engine 220. The selector 250 is an example of the selector 150 in FIG. 1. If content in the list of content that corresponds to an item category in the list of suppressed item categories, the selector 250 determines the content is not to be presented in the web page. The selector 250 compares the list of content to the list of suppressed item categories to determine which content is presentable. The computer system 230 then sends web page data 242 that includes item recommendation data 244 to the user device 210 to be presented in the web page. The item recommendation data 244 includes the content that is determined to be presented by the selector 250 and is presented as a recommendation in the web page.

Figure 3:
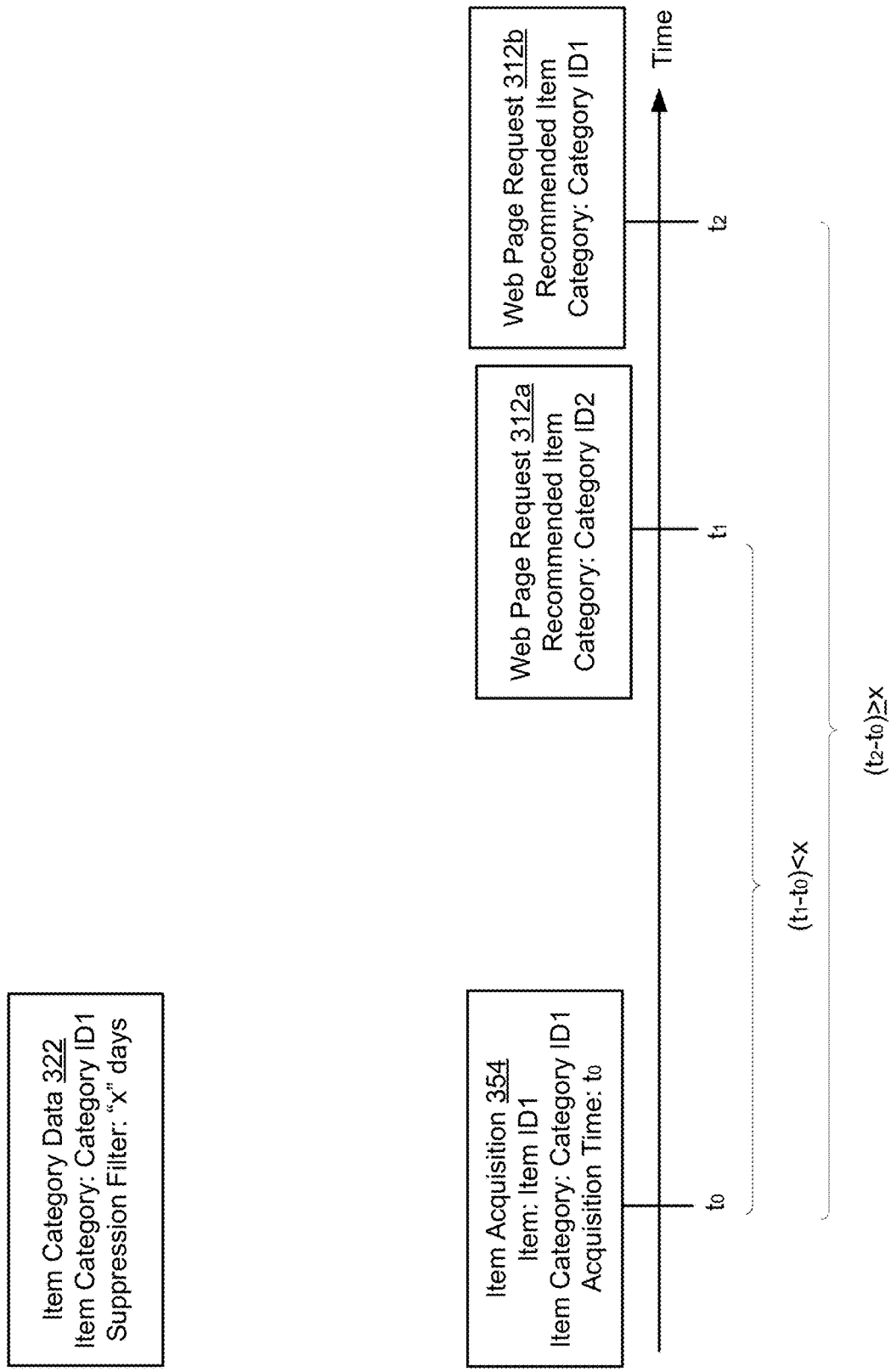
FIG. 3 illustrates an example of a suppression filter being applied to content presentation, according to an embodiment of the present disclosure.

FIG. 3 illustrates an example of a suppression filter being applied to content presentation, according to an embodiment of the present disclosure. Item category data 322 includes an indication of a particular item category, corresponding to category ID1, and a suppression filter associated with category ID1, which is "x" days. At time $t_0$, an item acquisition 354 for an item associated with item ID1 and category ID1 is received in association with an account. The item acquisition 354 is stored in account data for the account. From time $t_0$, the suppression filter is applied for "x" days for the category ID1. At time $t_1$, a first web page request 312a is received in association with the account. Since $t_1$ is less than "x" days from to, the suppression filter applies. Therefore, recommendation content about items associated with category ID1 is determined to not be presented. As a result, recommendation content about an item associated with a category ID2 is presented at the web page. At time $t_2$, a second web page request 312b is received in association with the account. Since $t_2$ is more than "x" days from to, the suppression filter is not applicable. Therefore, recommendation content about items associated with category ID1 can be determined to be presented. As illustrated, recommendation content about an item associated with category ID is presented at the web page in response to the second web page request 312b.

Figure 4:
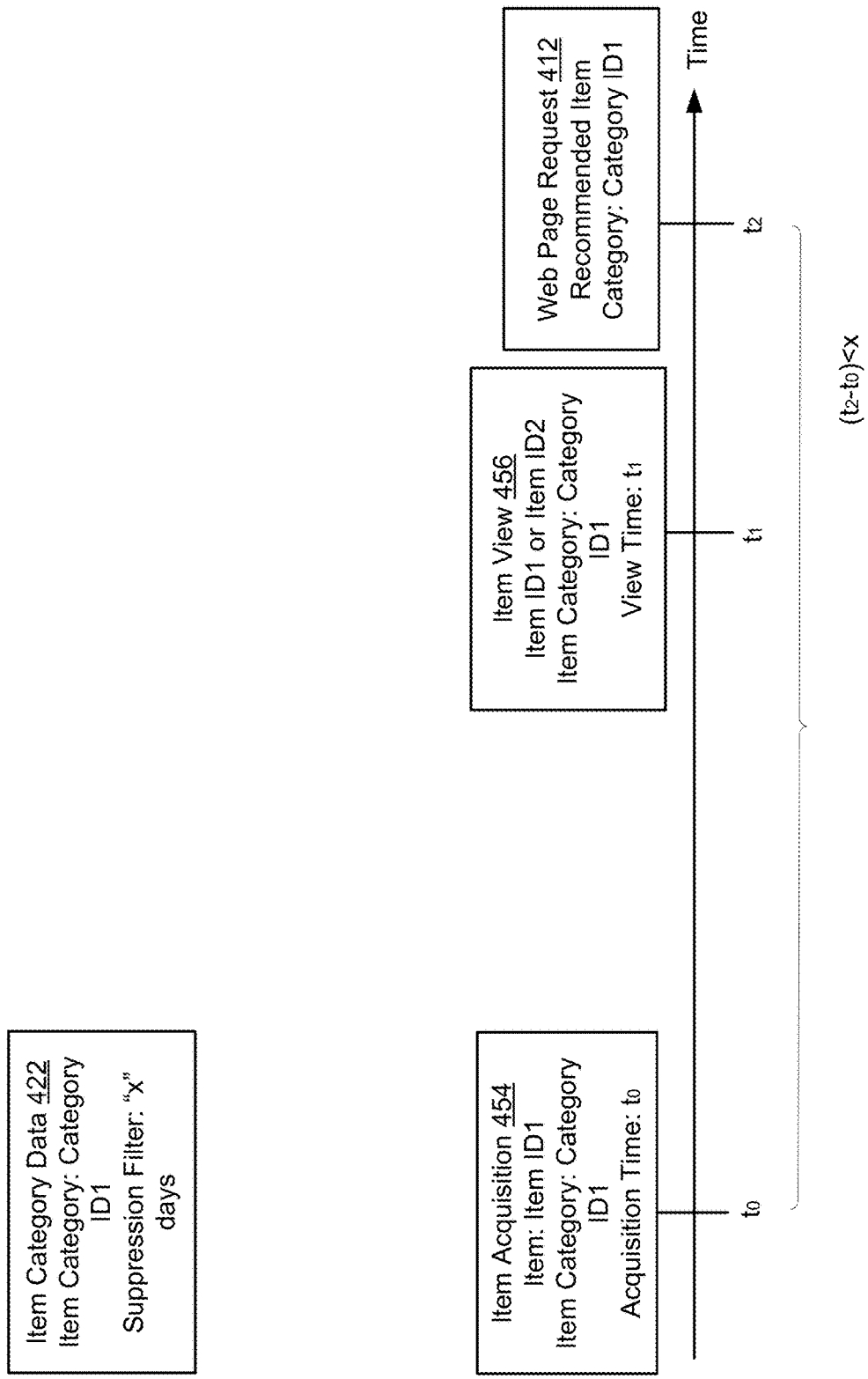
FIG. 4 illustrates an example of an item view affecting a suppression filter being applied to content presentation, according to an embodiment of the present disclosure.

FIG. 4 illustrates an example of an item view affecting a suppression filter being applied to content presentation, according to an embodiment of the present disclosure. Item category data 422 includes an indication of a particular item category, corresponding to category ID1, and a suppression filter associated with category ID1, which is "x" days. At time $t_0$, an item acquisition 454 for an item associated with item ID and category ID is received for the account. The item acquisition 454 is stored with account data for the account. From time $t_0$, the suppression filter is applied for "x" days for the category ID1. At time $t_1$, an item view 456 is received in association with the account. The item view 456 is associated with an item having an item ID or an item ID2, both of which are associated with item category ID1. At time $t_2$, a web page request 412 is received in association with the account. Even though $t_2$ is less than "x" days from $t_0$, the suppression filter is not applicable because of the item view 456. As a result, recommendation content about items associated with category ID can be determined to be presented. As illustrated, content recommendation about an item associated with category ID is presented at the web page in response to the web page request 412.

Figure 5:
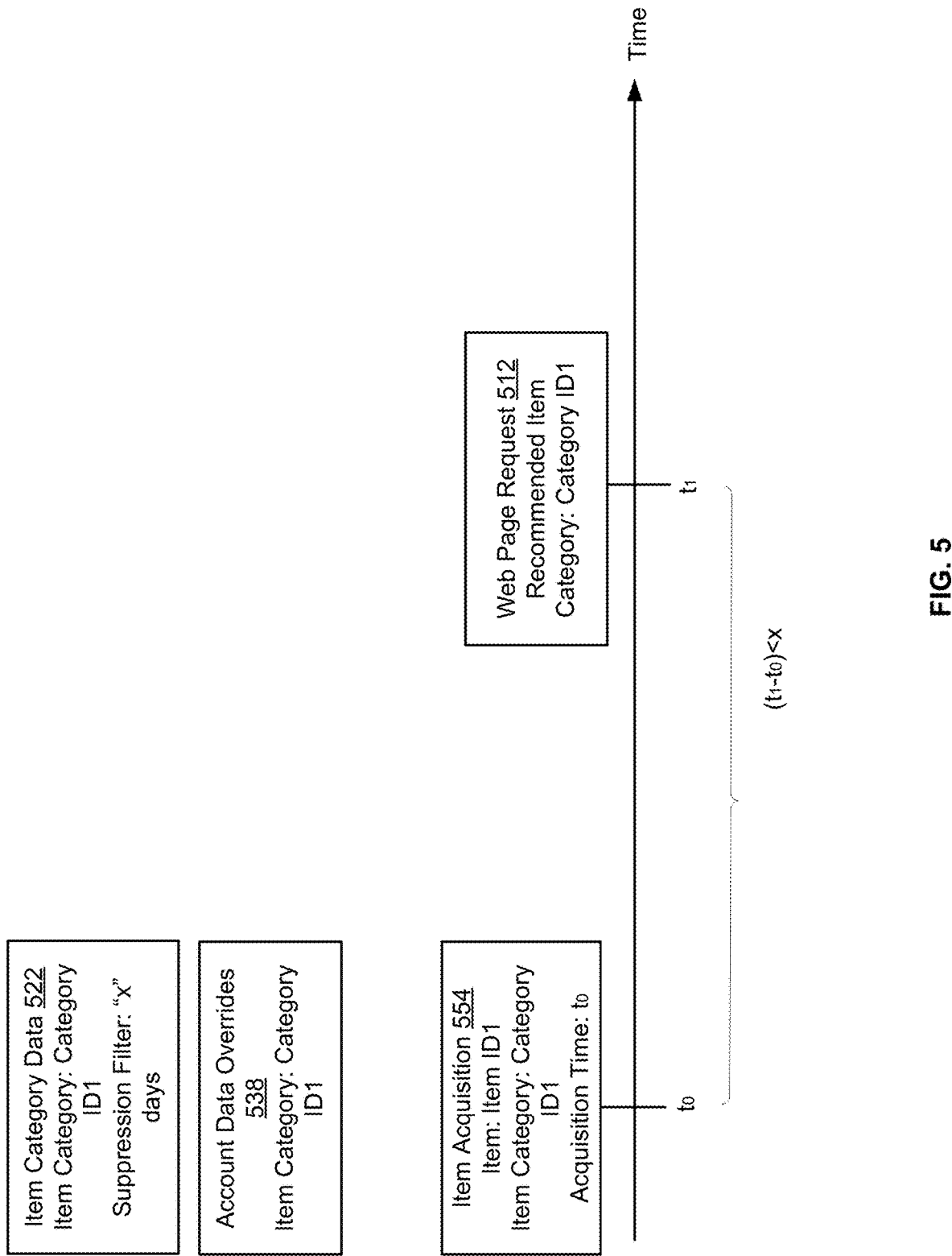
FIG. 5 illustrates an example of an override affecting a suppression filter being applied to content presentation, according to an embodiment of the present disclosure.

FIG. 5 illustrates an example of an override affecting a suppression filter being applied to content presentation, according to an embodiment of the present disclosure. Item category data 522 includes an indication of a particular item category, corresponding to category ID1, and a suppression filter associated with category ID1, which is "x" days. Additionally, account data associated with the account includes overrides 538 for item categories. As illustrated, the account includes an override 538 for item category ID1. At time $t_0$, an item acquisition 554 for an item associated with item ID1 and category ID1 is received for the account. The item acquisition 554 is stored with the account data for the account. From time $t_0$, the suppression filter is applied for "x" days for the category ID1. At time $t_1$, a web page request 512 is received in association with the account for an item having an item ID in category ID1. Even though $t_1$ is less than "x" days from $t_0$, the suppression filter is not applicable because of the override 538 for category ID1 for the account. As a result, content recommendation about items associated with category ID1 can be determined to be presented. As illustrated, content recommendation about an item associated with category ID1 is presented at the web page in response to the web page request 512.

Figure 6:
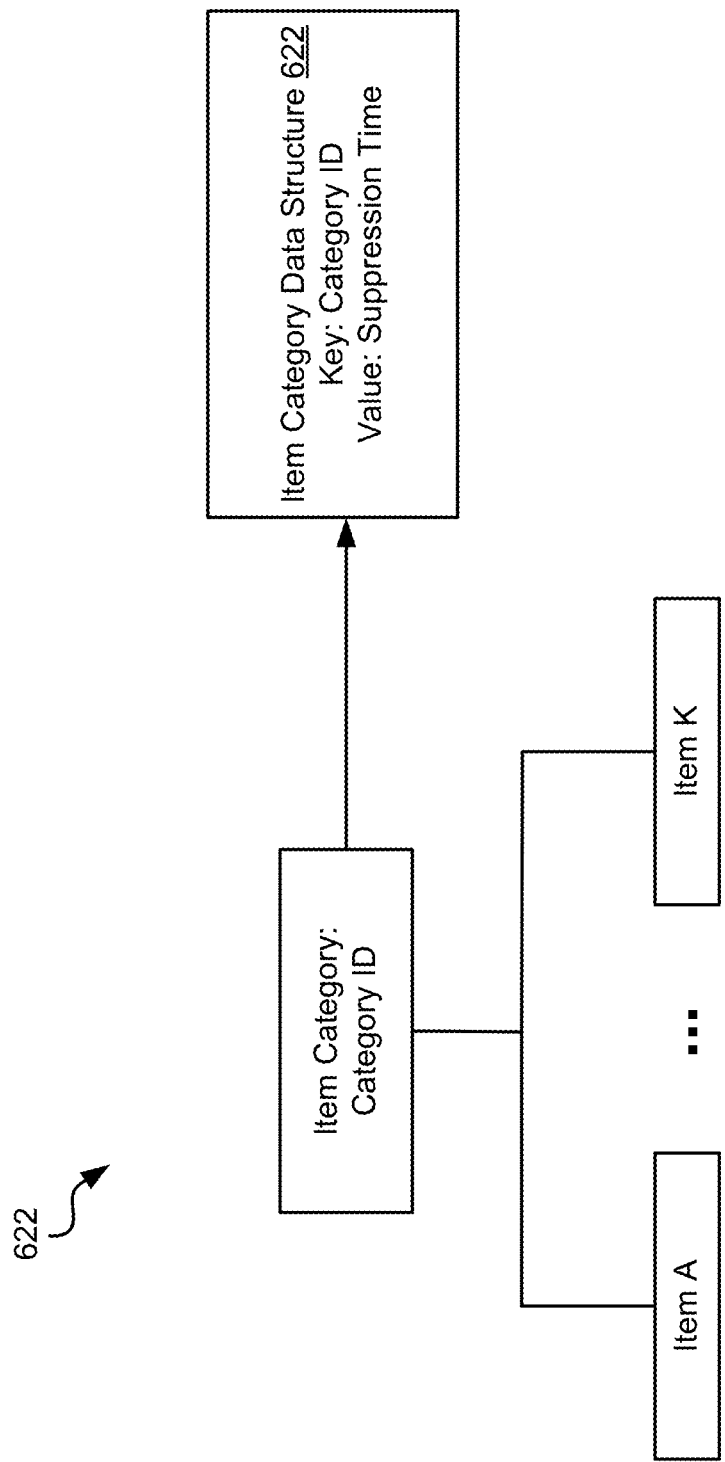
FIG. 6 illustrates an example of item category data, according to an embodiment of the present disclosure.

FIG. 6 illustrates an example of item category data 622, according to an embodiment of the present disclosure. As illustrated, the item category data 622 corresponds to a category ID. Within the item category for the category ID are item A through item K (e.g., the data structure of the item category includes a list of item IDs corresponding to the items that belong to the item category). The items in the item category may be similar items (e.g., different brands and styles of vacuums). Additionally, the items may be associated with a similar use (e.g., different brands and styles of vacuums and vacuum bags).

The item category data 622 associated with the category ID is stored in an item category data structure 662. The item category data structure 662 includes, as a key, the category ID and, as a value, one or more suppression filter characteristics of a suppression filter associated with the item category. A suppression filter characteristics can define a time period in which information about one or more items of the item category is prevented from being displayed in a recommendation space. This time period is also referred to herein as suppression time. Other suppression filter characteristic are possible and can relate to the presentation of such information (e.g., can limit the number of items of the item category for which recommendations can be presented, can set a presentation style for displaying a recommendation, etc.) A computer system can look-up the item category data structure 662 in response to a web page request to determine the suppression filter that apply to the item category. Similar data structures can be used for other category IDs and/or a single data structure can be used, where the keys correspond to the item categories and the values correspond to the suppression times FIG. 7 illustrates an example of data structures of account data 632 for an account, according to an embodiment of the present disclosure. The account data 632 includes four data structures, each of which are accessible using an account ID associated with the account. As illustrated, the account data 632 includes an item data structure 772, an item acquisition data structure 774, and item view data structure 776, and an override data structure 778.

In an example, the item data structure 772 stores an association between items and item categories. The item data structure 772 includes a key indicating an item ID of an item and a value of a category ID associated with the item ID. The item acquisition data structure 774 stores information about item acquisitions for the account. The item acquisition data structure 774 includes a key indicating either an item ID or a category ID associated with an acquired item. The item acquisition data structure 774 also includes a value of either an acquisition time and/or the category ID for the item. For example, if the key is the item ID, the value may be the acquisition time and the category ID. Alternatively, if the key is the category ID, the value can be the acquisition time. The item view data structure 776 stores information about item views for the account. The item view data structure 776 includes a key indicating either an item ID or a category ID associated with a viewed item. The item view data structure 776 also includes a value of either view time or the category ID for the item. For example, if the key is the item ID, the value may be the view time and the category ID. Alternatively, if the key is the category ID, the value can be the acquisition time. The override data structure 778 stores an association between an account and item categories associated with an override. For example, the override data structure 778 includes, as a key, the account ID and, as a value, a category ID for which the override applies.

FIGS. 8-11 illustrate examples of flows for aspects of the present disclosure. Operations of the flows can be performed by a computer system, such as the computer system 130. Some or all of the instructions for performing the operations can be implemented as hardware circuitry and/or stored as computer-readable instructions on a non-transitory computer-readable medium of the computer system. As implemented, the instructions represent modules that include circuitry or code executable by processor(s) of the computer system. The use of such instructions configures the computer system to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

Figure 8:
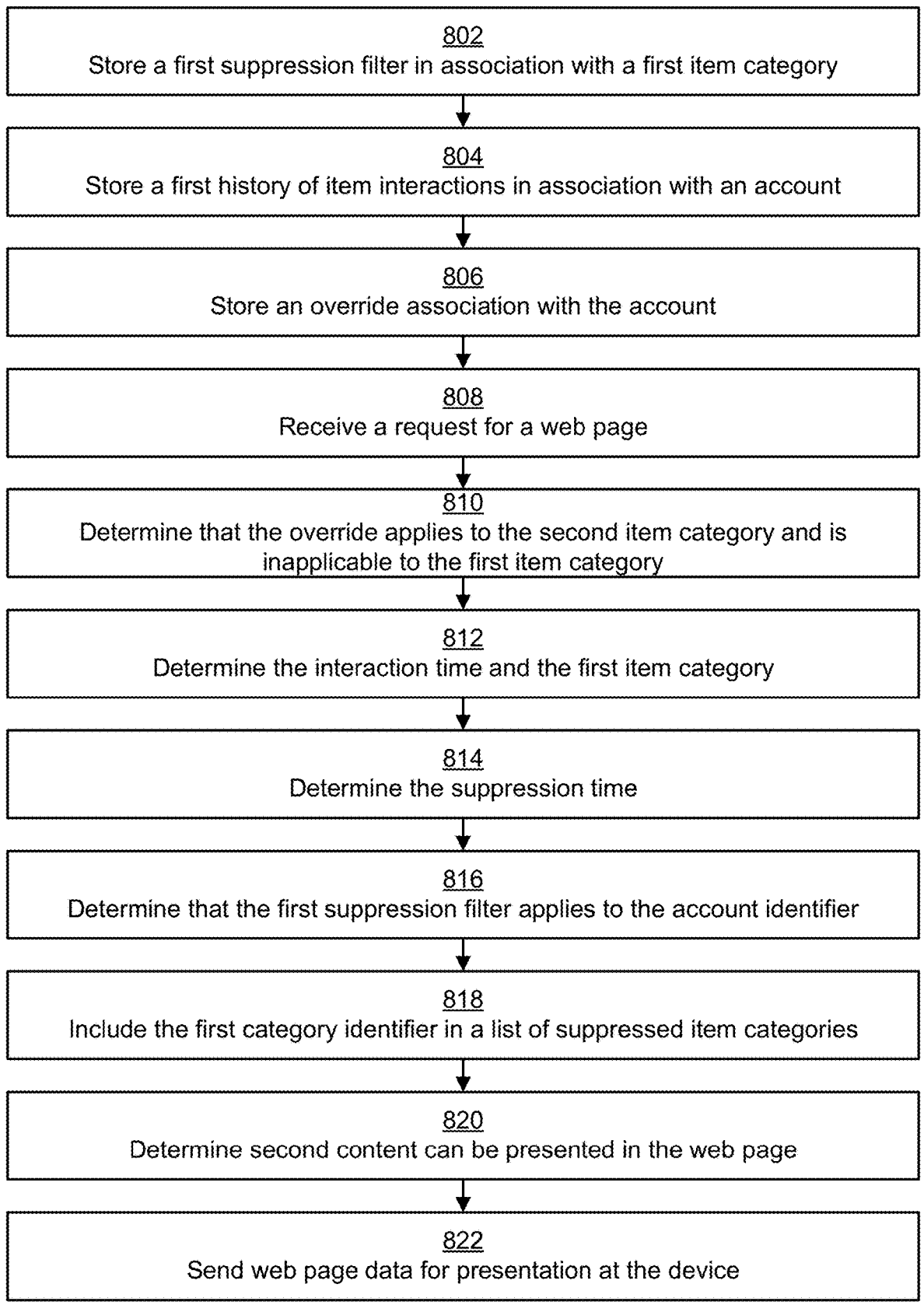
FIG. 8 illustrates an example of a flow for determining suppression filters for presenting content, according to an embodiment of the present disclosure.

FIG. 8 illustrates an example of a flow for determining suppression filters for presenting content, according to an embodiment of the present disclosure. In an example, the flow includes operation 802, where the computer system stores a first suppression filter in association with a first item category. The first item category includes a first item for which first content is presentable by a recommendation engine (e.g., recommendation engine 140 in FIG. 1). The first suppression filter prohibits the first content from being presented. The first suppression filter is stored in a key-value data set that includes a first category ID of the first category as a first key and a suppression time of the suppression filter as a first value.

In an example, the flow includes operation 804, where the computer system stores a first history of item interactions in association with an account. The item interactions include an online interaction, such as an online acquisition or an online view, associated with the first item or with a second item of the first item category. The first history of item interactions is stored in a second key-value data set that includes an account ID of the account as a second key, the first category ID as a second value, and an interaction time of the online interaction as a third value.

In an example, the flow includes operation 806, where the computer system stores an override associated with the account. The override indicates that a second suppression filter applicable to a second item category is inapplicable to the account. The override is stored in a third key-value data set that includes the account ID as a third key and a second category ID of the second item category as a fourth value.

In an example, the flow includes operation 808, where the computer system receives a request for a web page. The request is received from a device (e.g., user device 110 in FIG. 1) associated with the account.

In an example, the flow includes operation 810, where the computer system determines that the override applies to the second item category and is inapplicable to the first item category. The computer system looks up the third key-value data set using the account ID to determine to which item category the override applies.

In an example, the flow includes operation 812, where the computer system determines the interaction time and the first item category. The computer system looks up the second key-value data set using the account ID to determine the interaction time and the first item category.

In an example, the flow includes operation 814, where the computer system determines the suppression time (e.g., a suppression filter characteristics that can be recalled from memory by using the category identifier in a look-up of the first key-value data). The computer system looks up the first key-value data set using the first item category to determine the suppression time.

In an example, the flow includes operation 816, where the computer system determines that the first suppression filter applies to the account ID. The computer system compares the suppression time $t_0$ the interaction time $t_0$ determine that the first suppression filter applies to the account ID. For example, the first suppression filter can apply to the account ID if the suppression time is less than the interaction time from an initial acquisition of an item in the first item category.

In an example, the flow includes operation 818, where the computer system includes the first category ID in a list of suppressed item categories. The computer system includes the first category ID in the list of suppressed item categories based on the first suppression filter being applicable to the account ID. The list excludes the second category ID because the override applies to the second item category.

In an example, the flow includes operation 820, where the computer system determines second content can be presented in the web page. The determination is based on the list of suppressed item categories, where the second content is not associated with an item category on the list of suppressed item categories. Accordingly, the second content can be associated with a third item of the second item category.

In an example, the flow includes operation 822, where the computer system sends web page data for presentation at the device. The web page data indicates the second content.

In an illustration of the above flow, the computer system can receive, from a device associated with an account identifier, one or more keywords requesting first information about a first item. The first information is to be displayed in a first space of an online network document. The online network document is to include a recommendation space. For instance, the one or more keywords are received in a search request for items (e.g., shoes), where search results are to be displayed in a search result space of a web page, and where the web page can include one more recommendation spaces. Additionally, the computer system determines a category of items from which a second item can be selected such that second information about the second item can be displayed in the recommendation space. For example, the second item is a recommended item that belongs to an item category unrelated to the first item (e.g., the item category relates to toothpaste). Next, the computer system recalls, from memory, a suppression filter characteristic associated with the category of items. The suppression filter characteristic defines a time period in which the second information is prevented from being displayed in the recommendation space. For example, a suppression filter is defined for the category and is stored in the memory according to a data structure. The data structure is queried using a category identifier of the category and the query result indicates a value of the time period (e.g., the specific suppression time). Additionally, the computer system determines an interaction time associated with the account identifier in which a user has viewed or acquired one or more items in the category. For example, using the account identifier, the computer system queries a data structure associated with he account identifier, where this data structure indicates at least the items, and the corresponding acquisition time(s) and the corresponding item category (ies). The computer system determines, from the query result, that the item category is identified in the data structure and the corresponding acquisition time. The computer system then determines that the interaction time is greater than the time period defined by the suppression filter characteristic. Because the interaction time occurred outside of the time period, the computer system can determine that the suppression filer is inapplicable to the item category and, therefore, the second information can be displayed. Accordingly, the computer system sends, to the device, instructions to display the first information in the first space and the second information in the recommendation space. As such, the web page can be presented at the device, where the first information can be presented as a search result and the second information can be presented as a recommendation.

Figure 9:
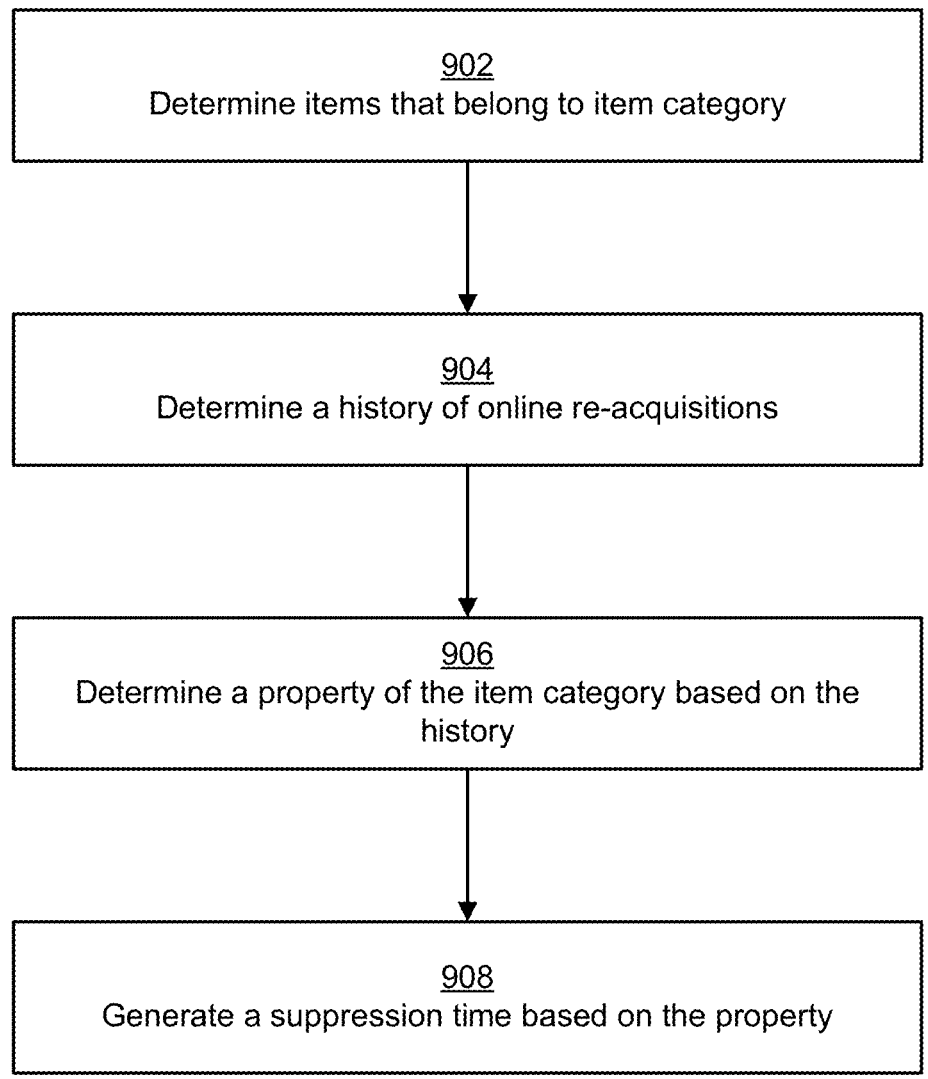
FIG. 9 illustrates an example of a flow for generating a suppression filter, according to an embodiment of the present disclosure.

FIG. 9 illustrates an example of a flow for generating a suppression filter, according to an embodiment of the present disclosure. In an example, the flow includes operation 902, where the computer system determines items that belong to an item category. The computer system groups items into categories by their associated use and/or based on common attributes that they share. For example, item categories may include "household toothpaste," "books," "computer chargers," etc.

In an example, the flow includes operation 904, where the computer system determines a history of online re-acquisitions. The history of online re-acquisitions is associated with a plurality of accounts. Additionally, the online re-acquisitions are associated with a plurality of items.

In an example, the flow includes operation 906, where the computer system determines a property of the item category based on the history. Based on the history of online re-acquisitions, the computer system determines an online re-acquisition frequency, an online re-acquisition likelihood, and/or an online re-acquisition time distribution for each item category. The online re-acquisition frequency indicates, on average, how often items of the item category are reacquired. The online re-acquisition likelihood indicates whether items in the item category are likely to be reacquired. The online re-acquisition time distribution indicates a probability of an online re-acquisition for items in the item category over time.

In an example, the flow includes operation 908, where the computer system generates a suppression time based on the property. For example, a lower online re-acquisition frequency or online re-acquisition likelihood can correspond to a longer suppression time. For the online re-acquisition time distribution, a probability threshold may be set (e.g., 25%), and the suppression time is based on the online re-acquisition time distribution reaching the probability threshold.

Figure 10:
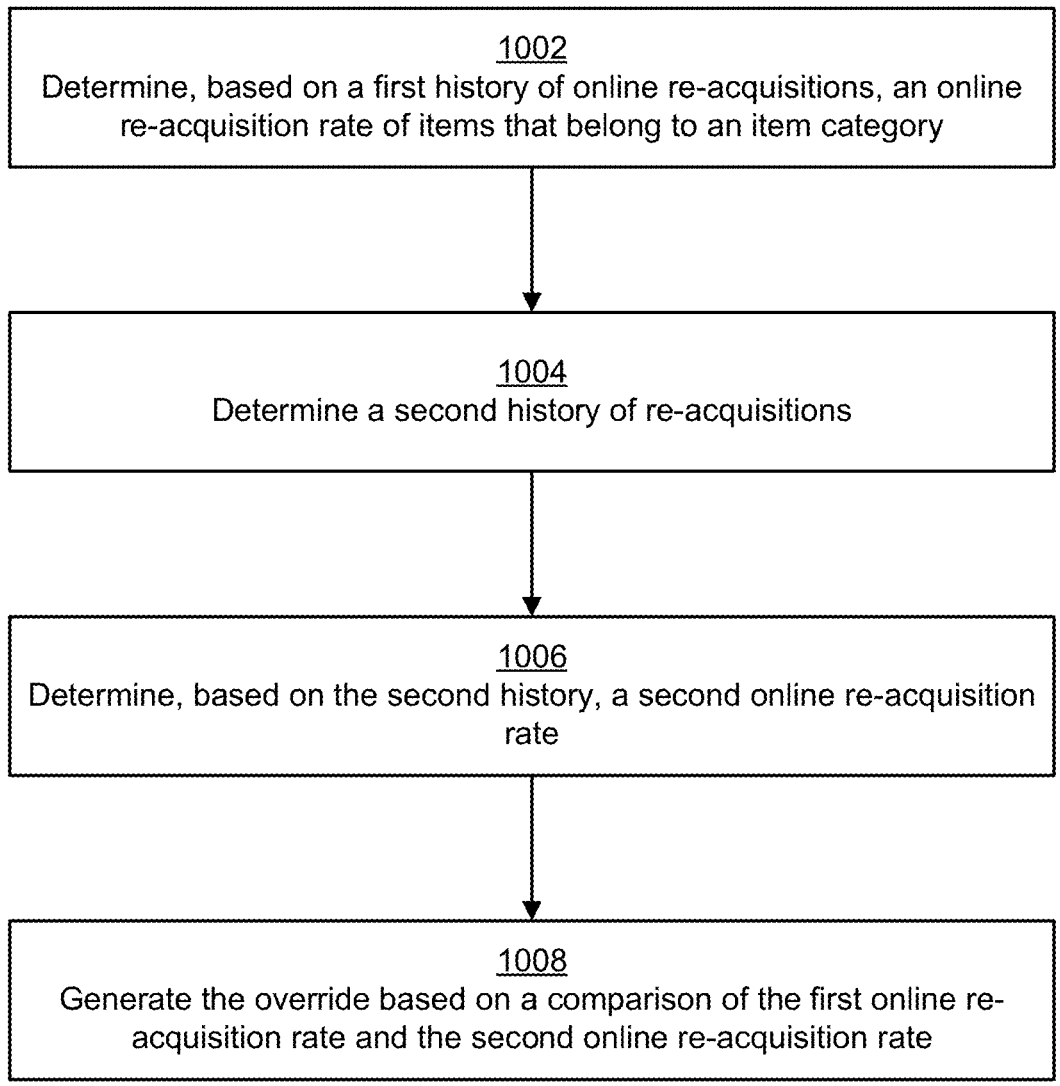
FIG. 10 illustrates an example of a flow for generating an override for a suppression filter, according to an embodiment of the present disclosure.

FIG. 10 illustrates an example of a flow for generating an override for a suppression filter, according to an embodiment of the present disclosure. In an example, the flow includes operation 1002, where the computer system determines, based on a first history of online re-acquisitions, an online re-acquisition rate of items that belong to an item category. The first history of online re-acquisitions is associated with an account identified by an account ID. The online re-acquisition rate is determined based on a history of item interactions associated with the account ID.

In an example, the flow includes operation 1004, where the computer system determines a second item history of re-acquisitions. The second history of online re-acquisitions is associated with a plurality of accounts. Additionally, the online re-acquisitions are associated with the item category.

In an example, the flow includes operation 1006, where the computer system determines, based on the second history, a second online re-acquisition rate. The second re-acquisition rate corresponds to an average re-acquisition rate associated with the item category across the plurality of accounts.

In an example, the flow includes operation 1008, where the computer system generates an override based on a comparison of the first online re-acquisition rate and the second online re-acquisition rate. If the first online re-acquisition rate is higher than the second online re-acquisition rate (e.g., the difference exceeds a predefined threshold), the computer system can determine the override is to apply to the account. This way, the account is able to receive recommendations for items it is more likely to reacquire, even if most accounts are not associated with as frequent of a re-acquisition.

Figure 11:
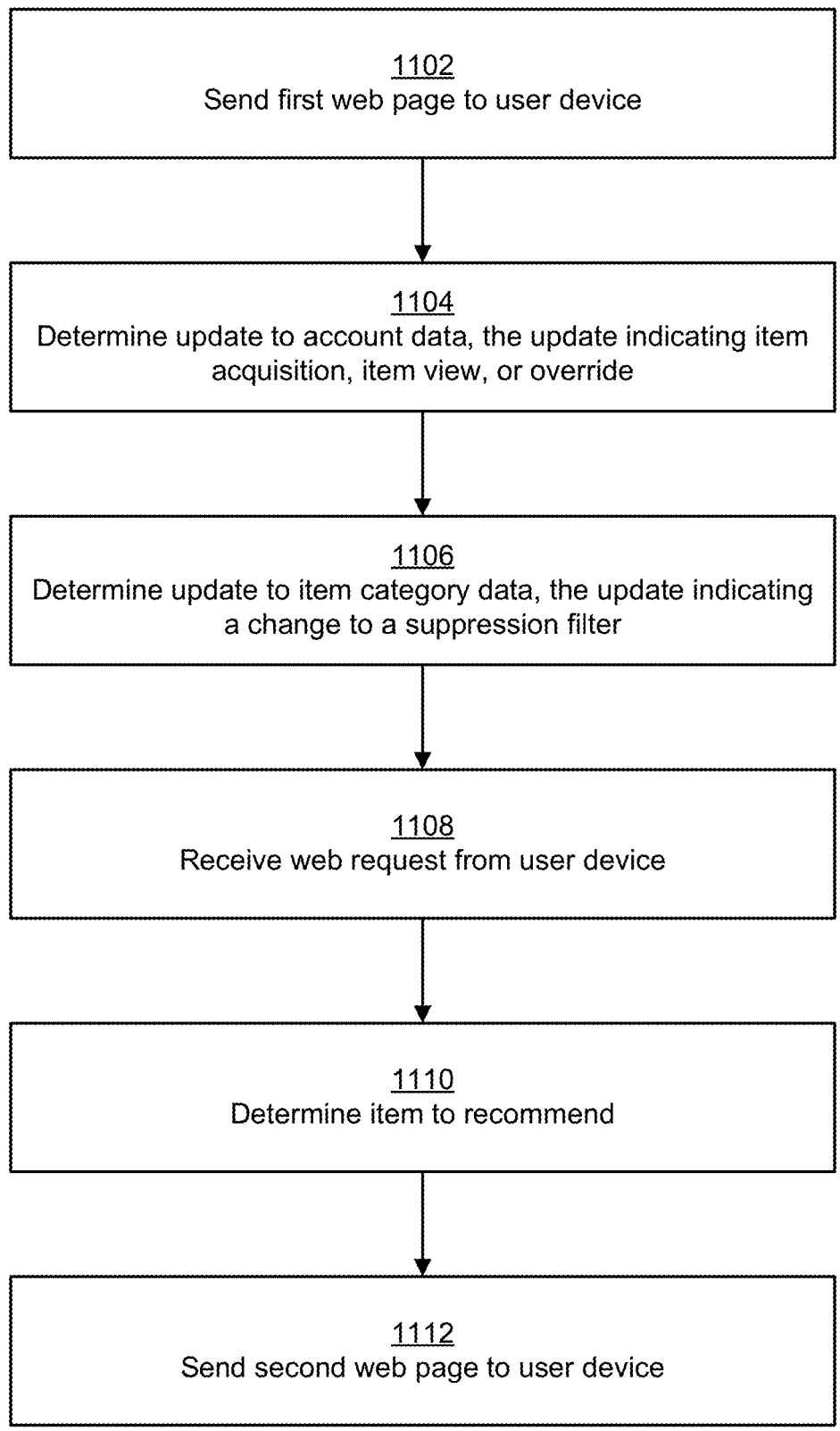
FIG. 11 illustrates an example of a flow for determining suppression filters for presenting content based on an update to a user account, according to an embodiment of the present disclosure.

FIG. 11 illustrates an example of a flow for determining suppression filters for presenting content based on an update to a user account, according to an embodiment of the present disclosure. In an example, the flow includes operation 1102, where the computer system sends a first web page to a user device. The first web page may include content of items in item categories that are not suppressed and may not include content of items in item categories that are determined to be suppressed for an account.

In an example, the flow includes operation 1104, where the computer system determines an update to account data. The update to the account data may include an item interaction associated with the account, or an addition or removal of an override for the account.

In an example, the flow includes operation 1106, where the computer system determines an update to item category data. The update to the item category data may include an update to a suppression filter, such as an updated suppression filter time. For example, the item category data may indicate that the suppression time for the suppression filter associated with an item category decreases.

In an example, the flow includes operation 1108, where the computer system receives a web request from a user device. The user device is associated with the account.

In an example, the flow includes operation 1110, where the computer system determines an item to recommend. Based on the updated suppression filter time, the computer system may determine that a suppression filter that applied to the first web page is no longer applicable.

In an example, the flow includes operation 1112, where the computer system sends a second web page to the user device. The second web page can include content of the item category that was previously subjected to the suppression filter.

Figure 12:
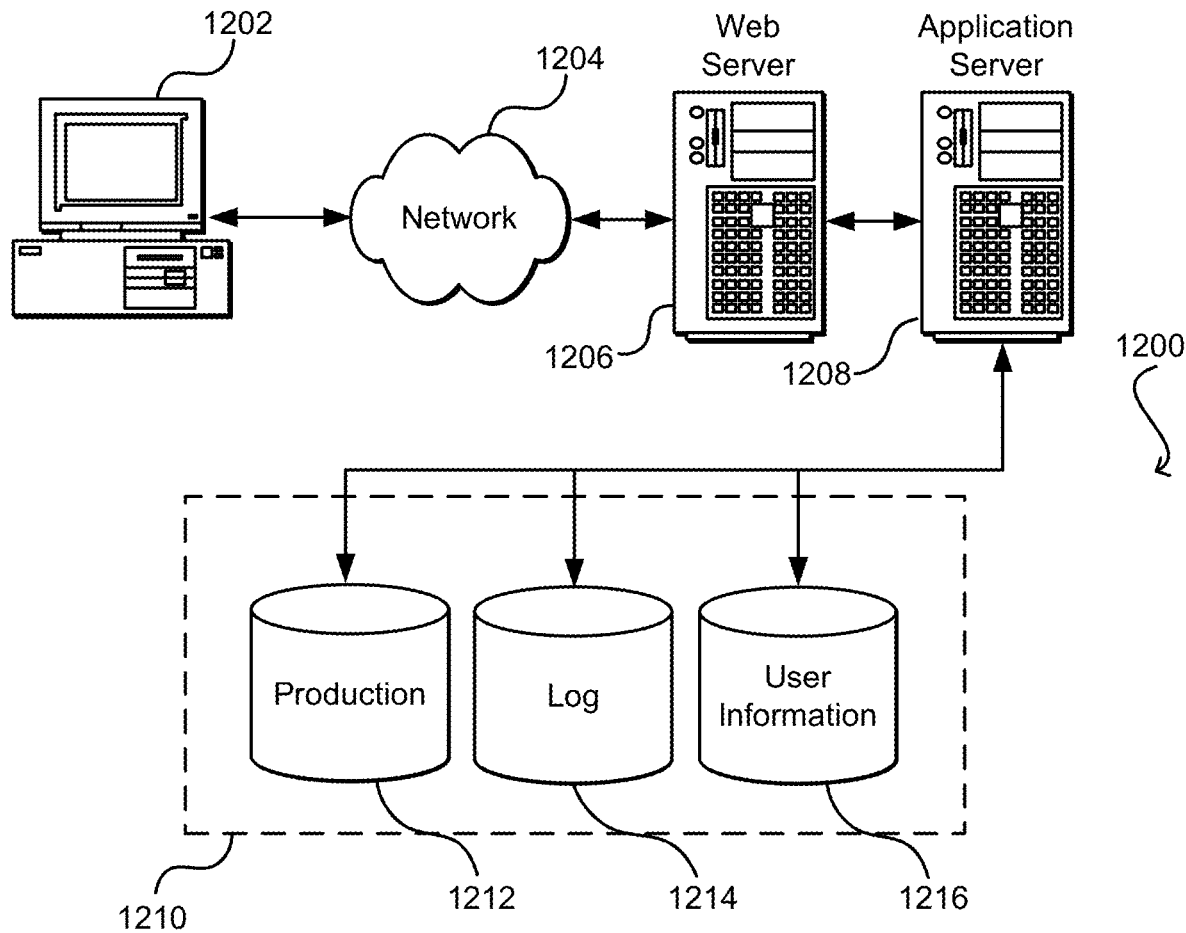
FIG. 12 illustrates aspects of an example environment for implementing aspects in accordance with various embodiments.

FIG. 12 illustrates aspects of an example environment 1500 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server.

It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle °, Microsoft °, Sybase °, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
one or more processors; and
one or more memories storing computer-readable instructions that, upon execution by the one or more processors, configure the system to:
receive, from a device associated with an account identifier, a request for a web page, the web page to include a recommendation space;
determine, based at least in part on a first data structure look-up, that an override applies to the account identifier;
determine, based at least in part on a second data structure look-up, an interaction time and a first item category;
determine, based at least in part on a third data structure look-up, a suppression time for a first suppression filter that applies to a plurality of account identifiers, the first suppression filter prohibiting a presentation of item information associated with the first item category;
determine, based at least in part on a comparison of the interaction time and the suppression time, that the first suppression filter applies to the account identifier;
determine that the override permits the presentation of the item information;
exclude, based at least in part on the override, a first category identifier of the first item category from a list of suppressed item categories;
determine, based at least in part on the list of suppressed item categories, that content can be presented in the recommendation space; and send, to the device in response to the request, web page data for presentation at the device, the web page data indicating the content.

2. The system of claim 1, wherein the one or more memories store further computer-readable instructions that, upon execution by the one or more processors, additionally configure the system to:
   determine a plurality of items that belong to the first item category;
   determine a history of online re-acquisitions, the history associated with a plurality of accounts, the online re-acquisitions associated with the plurality of items;
   determine a property of the first item category based at least in part on the history, the property including at least one: an online re-acquisition frequency, an online re-acquisition likelihood, or an online re-acquisition time distribution; and
   generate the suppression time based at least in part on the property.

3. The system of claim 1, wherein the one or more memories store further computer-readable instructions that, upon execution by the one or more processors, additionally configure the system to:
   determine, based at least in part on a first history of item interactions in association with the account identifier, a first online re-acquisition rate of one or more items that belong to the first item category, the first online re-acquisition rate associated with the account identifier;
   determine a second history of online re-acquisitions, the second history associated with a plurality of accounts, the online re-acquisitions associated with the first item category;
   determine, based at least in part on the second history, a second online re-acquisition rate associated with the plurality of accounts; and
   generate the override based at least in part on a comparison of the first online re-acquisition rate and the second online re-acquisition rate.

4. The system of claim 1, wherein the one or more memories store further computer-readable instructions that, upon execution by the one or more processors, additionally configure the system to:
   determine a history of online re-acquisitions, the history associated with a plurality of accounts, the online re-acquisitions associated with the first item category;
   determine, based at least in part on the history, an update to the first suppression filter, the update comprising an updated suppression time;
   store the updated suppression time;
   receive, after the updated suppression time is stored and from the device, another request for another web page;
   determine, based at least in part on a fourth data structure look-up, that the first suppression filter is inapplicable to a content presentation; and
   send, to the device in response to the other request, other web page data indicating the content presentation.

5. A computer-implemented method, comprising:
   receiving at a first timepoint, from a device associated with an account identifier, a request for first information about a first item, the request including one or more keywords, the first information to be displayed in a first space of an online network document, the online network document to include a recommendation space;
   determining, based at least in part on the one or more keywords, a category of items from which a second item can be selected such that second information about the second item can be displayed in the recommendation space;
   recalling, from memory, a suppression filter characteristic of a suppression filter that is set for the category of items and that is applicable to a plurality of account identifiers, the suppression filter characteristic being different from that of another category of items and defining a time period in which the second information is prevented from being displayed in the recommendation space;
   determining an interaction time associated with the account identifier in which a user has viewed or acquired one or more items in the category;
   determining a time duration between the interaction time and the first timepoint;
   determining that the time duration is smaller than the time period defined by the suppression filter characteristic such that the suppression filter applies to the account identifier thereby prohibiting displaying the second information in the recommendation space;
   determining that an override of the suppression filter is set for the account identifier, the override permitting the second information to be displayed in the recommendation space; and
   sending, to the device based at least in part on the override, instructions to display the first information in the first space and the second information in the recommendation space.

6. The computer-implemented method of claim 5, further comprising:
   storing, in a first data structure and prior to receiving the request, a category identifier of the category of items and the suppression filter characteristic of a suppression filter; and
   determining, after the request is received, that the suppression filter is applicable to the category of items based at least in part on a first look-up of the first data structure, the first look-up using the category identifier.

7. The computer-implemented method of claim 6, further comprising:
   storing, in a second data structure and prior to receiving the request, the account identifier, a value of the interaction time, and the category identifier; and
   determining, after the one or more keywords are received, that an online item interaction is applicable to the category of items based at least in part on a second look-up of the second data structure, the second look-up using the account identifier.

8. The computer-implemented method of claim 7, further comprising:
   determining, based at least in part on the first look-up, the time period;
   determining, based at least in part on the second look-up, the interaction time; and
   determining, based at least in part on a comparison of the interaction time and the time period, that the suppression filter is inapplicable to the account identifier.

9. The computer-implemented method of claim 5, further comprising:
   storing, in a data structure and prior to receiving the request, the override in association with an account, the override being based at least in part on a history of online item interactions.

10. The computer-implemented method of claim 9, further comprising:

determining, after the one or more keywords are received, that the override is applicable to a second category of items based at least in part on a look-up of the data structure, the look-up using the account identifier.

11. The computer-implemented method of claim 5, further comprising:
storing, in a data structure and prior to receiving the one or more keywords, the override in association with a third item of the category of items, the override indicating that a suppression filter applicable to the category of items is inapplicable to the third item; and
determining, after the request is received, that third information about the third item is displayable in the recommendation space based at least in part on the override.

12. The computer-implemented method of claim 5, further comprising:
storing, prior to receiving the one or more keywords, a first data structure that includes the account identifier and a category identifier of the category of items and that indicates an acquisition time corresponding to an online acquisition;
storing, prior to receiving the one or more keywords, a second data structure that includes the account identifier and the category of items and that indicates a view time corresponding to an online view, wherein the interaction time is at least one of the acquisition time or the view time; and
determining, after receiving the one or more keywords, that the suppression filter is applicable to the account identifier based at least in part on the first data structure and the second data structure.

13. The computer-implemented method of claim 12, further comprising:
determining, based at least in part on a first look-up of the first data structure, the acquisition time, the first look-up using the account identifier;
determining, based at least in part on a first comparison of the acquisition time and the time period, that the suppression filter is applicable to the account identifier;
determining, based at least in part on a second look-up of the second data structure, the view time, the second look-up using the account identifier; and
determining, based at least in part on a second comparison of the view time and the time period, that the suppression filter is applicable to the account identifier.

14. One or more non-transitory computer readable media storing instructions that, upon execution on a system, cause the system to perform operations comprising:
receiving at a first timepoint, from a device associated with an account identifier, a request for first information about a first item, the request including one or more keywords, the first information to be displayed in a first space of an online network document, the online network document to include a recommendation space;
determining, based at least in part on the one or more keywords, a category of items from which a second item can be selected such that second information about the second item can be displayed in the recommendation space;
recalling, from memory, a suppression filter characteristic of a suppression filter that is set for the category of items and that is applicable to a plurality of account identifiers, the suppression filter characteristic being different from that of another category of items and defining a time period in which the second information is prevented from being displayed in the recommendation space;
determining an interaction time associated with the account identifier in which a user has viewed or acquired one or more items in the category;
determining a time duration between the interaction time and the first timepoint;
determining that the time duration is smaller than the time period defined by the suppression filter characteristic such that the suppression filter applies to the account identifier thereby prohibiting displaying the second information in the recommendation space;
determining that an override of the suppression filter is set for the account identifier, the override permitting the second information to be displayed in the recommendation space; and
sending, to the device based at least in part on the override, instructions to display the first information in the first space and the second information in the recommendation space.

15. The one or more non-transitory computer readable media of claim 14 storing further instructions that, upon execution on the system, cause the system to perform additional operations comprising:
determining a plurality of items that belong to the category of items;
determining a history of online re-acquisitions, the history associated with a plurality of accounts, the online re-acquisitions associated with the plurality of items;
determining a property of the category of items based at least in part on the history, the property including at least one: an online re-acquisition frequency, an online re-acquisition likelihood, or an online re-acquisition time distribution;
defining a value of the time period based at least in part on the property; and
storing, in a data structure and prior to receiving the one or more keywords, a category identifier of the category of items and the value of the time period, the data structure indicating that the suppression filter is applicable to the category of items.

16. The one or more non-transitory computer readable media of claim 15, wherein the category is a first item category, and wherein the one or more non-transitory computer readable media further store additional instructions that, upon execution on the system, cause the system to perform further operations comprising:
generating a list of suppressed item categories, the list including at least a second item category and excluding the first item category;
determining a plurality of item recommendations, each corresponding to an item category; and
selecting the second information based on the plurality of item recommendations and the list, wherein the operations of (i) determining that the category, (ii) recalling the suppression filter characteristic, (iii) determining the interaction time, and (iv) and generating the list are performed in parallel to the operation of determining the plurality of item recommendations and prior to the operations of selecting the second information.

17. The one or more non-transitory computer readable media of claim 14, storing further instructions that, upon execution on the system, cause the system to perform additional operations comprising:
storing, in a data structure and prior to receiving the one or more keywords, a category identifier of the category of items and the time period, the data structure indicating that a suppression filter is applicable to the category of items;
receiving feedback data about item recommendations, the feedback data associated with a plurality of accounts, the item recommendations associated with the category of items;
determining an updated time period based at least in part on the feedback data; and
modifying the data structure to include the updated time period, the data structure stored independently of the account identifier.

18. The one or more non-transitory computer readable media of claim 14 storing further instructions that, upon execution on the system, cause the system to perform additional operations comprising:
determining a first online re-acquisition rate of items that belong to the category of items, the first online re-acquisition rate associated with the account identifier;
determining a second online re-acquisition rate of the items, the second online re-acquisition rate associated with a plurality of account identifiers;
generating, based at least in part on a comparison of the first online re-acquisition rate and the second online re-acquisition rate, the override the override indicating that the suppression filter applicable to the category is inapplicable to the account identifier; and
storing, prior to receiving the request, a data structure that includes the account identifier and a category identifier of the category and that indicates the override.

19. The one or more non-transitory computer readable media of claim 14 storing additional instructions that, upon execution on the system, cause the system to perform further operations comprising:
generating a search result that includes the first information, wherein the one or more keywords are received in a search request; and
sending, to the device, a search result for display in in the first space of the online network document.

20. The one or more non-transitory computer readable media of claim 14 storing further instructions that, upon execution on the system, cause the system to perform additional operations comprising:
determining, after sending the online network document to the device, an update to at least one of the suppression filter or an online item interaction;
modifying, based at least in part on the update, a first data structure that indicates the suppression filter or a second data structure that indicates the online item interaction;
receiving, from the device, a request for another online network document;
determining that the suppression filter is inapplicable to the account identifier based at least in part on the first data structure or the second data structure; and
sending, to the device in response to the other request, the other online network document.

* * * * *